(12) United States Patent
Cama

(10) Patent No.: US 7,797,389 B2
(45) Date of Patent: *Sep. 14, 2010

(54) MONITORING AND REPORTING USAGE OF NON-HYPERTEXT MARKUP LANGUAGE E-MAIL CAMPAIGNS

(75) Inventor: Karl Cama, Roanoke, TX (US)

(73) Assignee: International Business Machines Corporation, Armonk, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 12/050,345

(22) Filed: Mar. 18, 2008

(65) Prior Publication Data
US 2008/0168148 A1 Jul. 10, 2008

Related U.S. Application Data

(63) Continuation of application No. 11/243,421, filed on Oct. 4, 2005, now Pat. No. 7,366,762.

(51) Int. Cl.
*G06F 15/16* (2006.01)
*G06F 12/00* (2006.01)
(52) U.S. Cl. .................. 709/206; 709/207
(58) Field of Classification Search ......... 709/206–207, 709/250
See application file for complete search history.

(56) References Cited

U.S. PATENT DOCUMENTS

| | | |
|---|---|---|
| 6,453,337 B2 | 9/2002 | Miller et al. |
| 6,505,214 B1 | 1/2003 | Sherman et al. |
| 6,631,400 B1 | 10/2003 | DiStefano, III |
| 6,751,670 B1 | 6/2004 | Patterson |
| 6,789,108 B1 | 9/2004 | McMillan |
| 6,948,125 B2 | 9/2005 | Detweiler et al. |
| 6,978,316 B2 | 12/2005 | Ghaffar et al. |

(Continued)

FOREIGN PATENT DOCUMENTS

WO 0111442 A 2/2001

(Continued)

OTHER PUBLICATIONS

USPTO office action for 12/131,589 dated Jul. 27, 2009.

(Continued)

*Primary Examiner*—Zarni Maung
(74) *Attorney, Agent, or Firm*—Yee & Associates, P.C.; William H. Steinberg

(57) ABSTRACT

A method, apparatus, and computer usable program code for tracking and reporting e-mail campaigns. An instruction set is placed in a tagged e-mail to form a modified e-mail, wherein the data type of the instruction set is set to hypertext markup language. The modified e-mail is sent to a distribution list, wherein the instruction set is executed when the modified e-mail is opened. The instruction set captures and records attributes about a reader of the modified e-mail, requests a web page at a website, passes information about the e-mail and the reader, causes a local server to request the website image from an original version of the website located on an original server in response to the non existence of the web page, causes the original server to capture relevant information about the e-mail and the reader as tracking information, and transmits the captured tracking information to a collection device.

12 Claims, 10 Drawing Sheets

U.S. PATENT DOCUMENTS

| | | |
|---|---|---|
| 7,076,533 B1 | 7/2006 | Knox et al. |
| 7,120,590 B1 | 10/2006 | Eisen et al. |
| 7,196,621 B2 | 3/2007 | Kochis |
| 7,216,149 B1 | 5/2007 | Briscoe et al. |
| 7,216,290 B2 | 5/2007 | Goldstein et al. |
| 7,249,171 B2 | 7/2007 | Goto |
| 7,356,606 B2 | 4/2008 | Choate |
| 7,366,762 B2 * | 4/2008 | Cama .................. 709/206 |
| 7,496,841 B2 | 2/2009 | Hadfield et al. |
| 2002/0066028 A1 | 5/2002 | Welborn et al. |
| 2002/0104026 A1 | 8/2002 | Barra et al. |
| 2003/0018727 A1 | 1/2003 | Yamamoto |
| 2004/0078447 A1 | 4/2004 | Malik et al. |
| 2004/0205653 A1 | 10/2004 | Hadfield et al. |
| 2005/0198158 A1 | 9/2005 | Fabre et al. |
| 2006/0095511 A1 | 5/2006 | Munarriz et al. |
| 2007/0079009 A1 | 4/2007 | Cama |
| 2007/0094331 A1 | 4/2007 | Cama |
| 2007/0094332 A1 | 4/2007 | Cama |
| 2008/0228891 A1 | 9/2008 | Cama |
| 2009/0019127 A1 | 1/2009 | Cama |
| 2009/0248825 A1 | 10/2009 | Cama |

FOREIGN PATENT DOCUMENTS

| | | |
|---|---|---|
| WO | 02082293 A | 10/2002 |

OTHER PUBLICATIONS

USPTO Notice of Allowance for U.S. Appl. No. 12/246,187 dated Dec. 16, 2009.

USPTO Office Action for U.S. Appl. No. 12/131,589 dated Dec. 17, 2009.

USPTO office action for U.S. Appl. No. 12/131,589 dated Mar. 25, 2010.

* cited by examiner

FIG. 6

```
- <urllink showborder="false" href=http://www.website_name.com/page_no/>
  - <run html="false" highlight="none" readingorder="lefttoright">
    <font size="12pt" style="bold" name="Verdana" pitch="variable" truetype="true" color="#293d6b" />
    Support & downloads
  </run>
</urllink>
```

- 602: `<urllink showborder="false" href=`
- 604: `http://www.website_name.com/page_no/`
- 608: `<font size="12pt" style="bold" name="Verdana" pitch="variable" truetype="true" color="#293d6b" />`
- 606: `Support & downloads`

FIG. 7

```
- <urllink showborder="false" href=http://www.website_generic.com/uc.GIF?1.50&http://www.website_name.com/page_no/
  &campaign_group_name/authors_name/campaign_name/Support%20%26%20downloads/YYYY-MM-DD/dl=CN=distribution_list/
  OU=location/O=company/sz=0">
  - <run html="false" highlight="none" readingorder="lefttoright"><font size="12pt" style="bold" name="Verdana"
    pitch="variable" truetype="true" color="#293d6b" />
    Support & downloads
  </run>
</urllink>
```

```
http://www.website_generic.com/uc.GIF?1.50&http://www.website_name.com/page_no/&campaign_group_name/authors_name/
campaign_name/Support%20%26%20downloads/YYYY-MM-DD/dl=CN=distribution_list/OU=location/O=company/sz=0
```

- 804, 802, 806

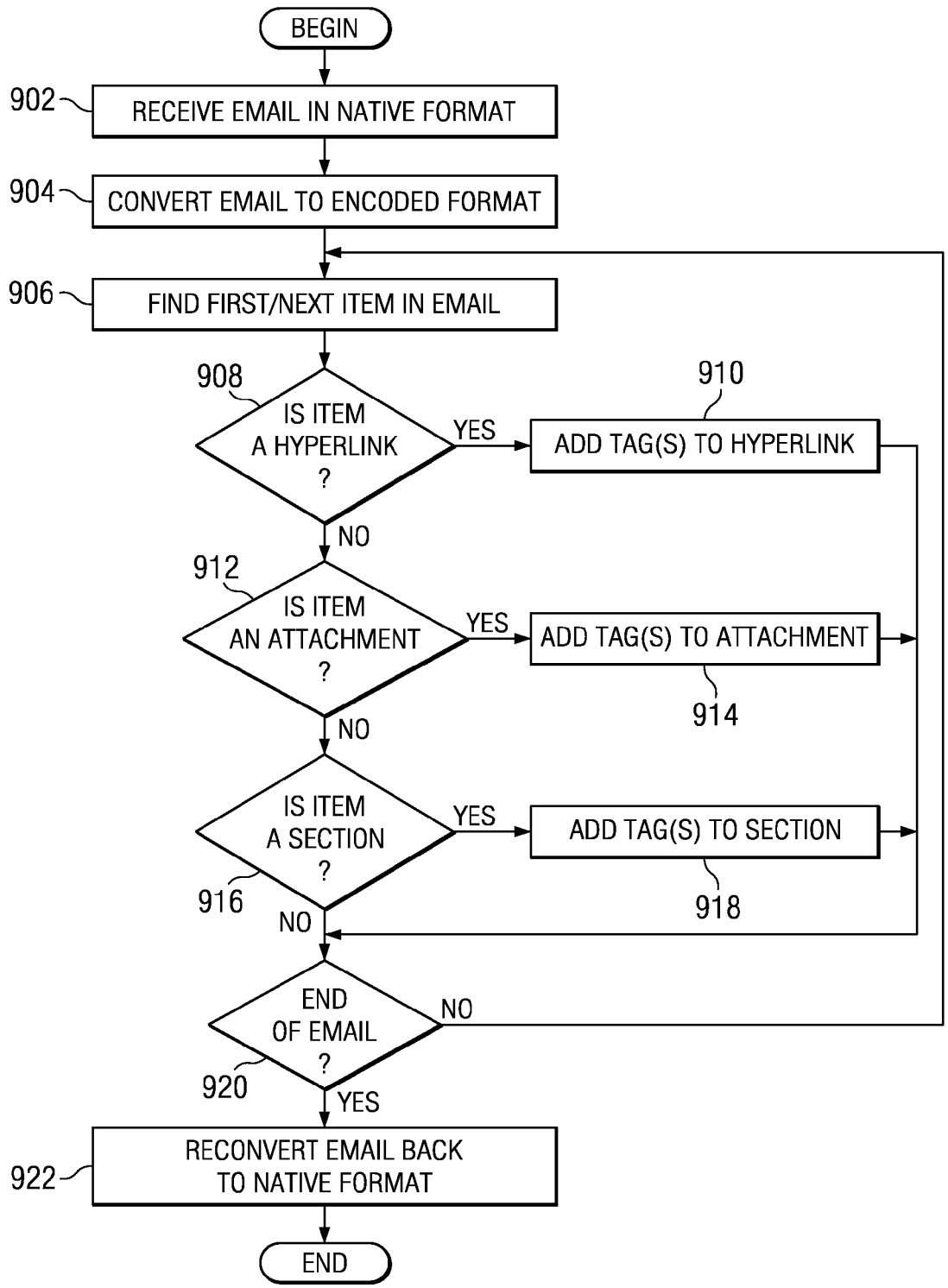

*FIG. 10*

1006 ▷ Section Title ~ 1002
This is Text in a section ~ 1004

```
<body>
 - <richtext>
     <pardef id="1" leftmargin="0.7500in" align="left" linespacing="1" spacebefore="1" spaceafter="1"
newpage="false" list="none" readingorder="lefttoright" />
   - <section expanded="true" showastext="false">
     - <sectiontitle pardef="1" borderstyle="shadow" color="teal" hidewhenexpanded="false">
         <text>Section Title</text>
       </sectiontitle>
       <pardef id="2" align="left" linespacing="1" spacebefore="1" spaceafter="1" newpage="false"
list="none" readingorder="lefttoright"/>
       <par def="2">This is Text in a section </par>
       <par/>
       <par/>
     - <par>
         <field type="richtext" kind="editable" name="Body" allowmultivalues="false" protected="false"
sign="false" computeaftervalidation="false" defaltfocus="false" showdelimiters="true"
allowtabout="false" useappletinbrowser="false" storelocally="false" dataconnectionfield="data" />
       </par>
     </section>
     <par def="2" />
   </richtext>
 </body>
```

1008

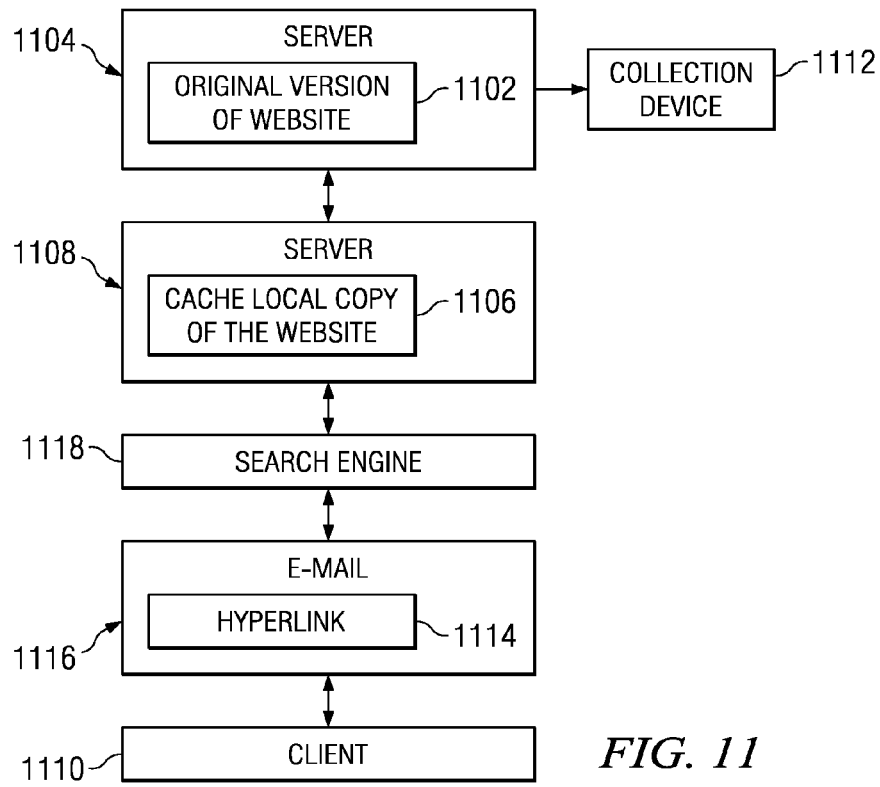

```
<html><body><img src="
http://stats.surfaid.ihost.com/crc/images/uc.GIF?1.50&saemail&saemail&sa_campaign=emailtest/
John Doe/GIFTEST/email_opens/3-29-2005/dl=Other/sz=1 " height="1" width="1" alt=""
border="0"></body></html>
```

FIG. 13

```
http://stats.surfaid.ihost.com/crd/uc.GIF?1.50&saemail&saemail&
http://www.ibm.com/i/v14/t/ibm-logo.gif&sa_campaign=emailtest/John
Doe/ibm_gif_test/IBM%20LOGO%20/2005-04-01/dl=Other/sz=1
```

FIG. 14

```
Options                                              1400
Option Public
Const TYPE_HTML = 21
Const ITEM_SIGN = &H0001

Declarations ' to set up the calls to the appropriate Notes API/DLL's and modules required
Declare Function NSFItemAppend Lib "nnotes" (Byval noteHandle As Long,
Byval iFlags As Integer, Byval iNa Lmbcs String,Byval iNameLength As Integer,
Byval iType As Integer, Byval iValuePointer As Long, Byval iVa Long) As Integer
Declare Function OSMemAlloc Lib "nnotes" (Byval T As Integer, Byval S As Long,
hM As Long) As Integer
Declare Function OSMemFree Lib "nnotes" (Byval hM As Long) As Integer
Declare Function OSLockObject Lib "nnotes" (Byval H As Long) As Long
Declare Sub OSUnlockObject Lib "nnotes" (Byval H As Long)
Declare Sub Poke Lib "kernel32" Alias "RtlMoveMemory" (Byval P As Long,
Byval D As Lmbcs String, Byval            1404 sa_tag = "http://www.ibm.com/i/v14/t/ibm-logo.gif" ' pointer to the IBM Logo gif image
1402
  itemname = "Body" ' handle to the Body Rich text Item
  html = | <html><body><img src="|&Trim(sa_tag)&" " & |" height="1" width="1"
alt="" border="0"></body>< memLen = Len(html) 'get the total length of the instruction set
rc = OSMemAlloc( 0, memLen, memHandle)
memPtr = OSLockObject(memHandle)
Poke memPtr, html, memLen 'invoke the NSFAppendItem, passing the itemname (=Body) , the Type and the HTML
instruction
rc = NSFItemAppend( memodoc.handle, ITEM_SIGN , itemname,
Len(itemname), TYPE_HTML, memPtr
OSUnlockObject memHandle
OSMemFree memHandle
```

FIG. 15

```
                                                    1500
<HTML>
<Body>
<SCRIPT LANGUAGE="JavaScript">
1502  alert("examplel of a Javascript execution from within a Rich Text field")
</SCRIPT>
</Body>
</HTML>
```

MONITORING AND REPORTING USAGE OF NON-HYPERTEXT MARKUP LANGUAGE E-MAIL CAMPAIGNS

This application is a continuation of application Ser. No. 11/243,421, filed Oct. 4, 2005, status allowed.

BACKGROUND OF THE INVENTION

1. Field of the Invention

The present invention relates generally to an improved data processing system and, in particular, to a method, system, and computer program product for optimizing performance in a data processing system. Still more particularly, the present invention provides a method, system, and computer program product for identifying and tracking electronic mail campaigns.

2. Description of the Related Art

As the Internet has matured, so has electronic mail, which is also referred to as e-mail. In particular, the content, layout, and architecture of e-mail have significantly improved over time. E-mail has become richer in terms of its ability to convey a message as it can blend together audio, video, artwork, and other content. E-mail can contain a combination of items, including attached files and hyperlinks. The files may contain text, video, audio, graphics, and other rich content. The hyperlinks may contain links to a network such as the Internet, an intranet or an extranet. Due to these capabilities, in the $21^{st}$ century e-mail is preferred by over 93 percent of U.S. based Internet users as the communication medium of choice.

As the reach of the Internet grows and e-mail as a communications medium becomes more prolific, newsletter authors, advertisers, and marketers alike are trying to leverage this new channel and extend their reach on a daily basis. As savvy marketers attempt to extend their reach and tap into a global economy, e-mail based marketing campaigns rank number one as a vehicle of choice. E-mail is fast, inexpensive, and reliable for reaching the large masses, especially when compared to methods such as outbound call centers or direct mail. E-mail also has the capability of delivering targeted and customized messaging to specific audiences. As a result, e-mail campaigns cover the full range from product and service announcements to business partnerships and beyond.

Problems with the ability to track or identify e-mail readership over time include knowing if a reader ever opened and read the message, which hyperlinks were most popular, and which attachments were opened most often. E-mail authors need this information to improve the effectiveness of future e-mail campaigns. Given the significant amounts of investments being made in e-mail based campaigns and newsletters, a number of methods exist in the commercial world to address hypertext markup language (HTML) based e-mails. Tracking of e-mail is fundamentally achieved by incorporating a probe or some mechanism within the e-mail whereby the e-mail can be tracked and the readership identified. In most situations, e-mail is typically created using HTML or text and delivered as multipurpose Internet mail extensions (MIME) based e-mail. The simplest way to track HTML formatted e-mail is by the inclusion of a reference to an external image, typically 1 pixel wide. The loading of the image by a web browser causes a small amount of code to be executed. Such code, typically written in JavaScript® language, has the capability of capturing the desired information about the e-mail, allowing e-mail authors to track and report on usage.

In contrast, Lotus Notes® based e-mail presents an interesting challenge because an e-mail generated by Lotus Notes® is typically non-HTML based and it is not simple text. Lotus Notes® is a rich and complex system, allowing for the inclusion of graphics, audio, video, complex tables, and other content. But Lotus Notes® does not provide for a mechanism to track and identify unique or repeat readers of any e-mail. Currently, no solution is available that allows native Lotus Notes® based e-mails to be automatically tracked and reported on.

Many of the world's largest corporations use Lotus Notes® as their e-mail of choice. A solution to track and report on Lotus Notes® based e-mail benefits any enterprise looking for response rates to campaigns and gives e-mail authors the ability to measure readership for any e-mail, whether it be part of a formal campaign, executive communication, team event, or some significant occurrence.

The Lotus Notes® Client is a highly secure client. It is not easy for an e-mail author to customize or alter a given corporation's mail template as templates are highly protected. Another problem involves the ability to insert any type of probe or tracking mechanism into e-mail created by the Lotus Notes® Client. Any inclusion or introduction of a probe has to be done in such a manner so as to preserve the authenticity of the e-mail message and ensure that any actions by the probe or tracking mechanism remain totally transparent to the recipient and within the security features enabled by the Lotus Notes® Client.

E-mail campaigns created by Lotus Notes® usually contain links to websites, or hyperlinks. The intent of most e-mail campaigns is to try to get the reader of any given e-mail to select the links within the e-mail and subsequently visit the linked website. The creation of a hyperlink or hotspot is what facilitates its selection, typically using a mouse to click on the hyperlink or hotspot. Assuming uniform resource locator (URL) hyperlinks within a given e-mail are tagged or instrumented, a subsequent problem is the tracking and reporting of any of the various types of URL hyperlinks.

A technical problem is the absence of a convenient mechanism or published applications program interface (API) to directly access hotspots and hyperlinks that exist within an e-mail created by Lotus Notes®. Furthermore, such a mechanism or API has to address issues of security and transparency, and also be capable of tagging all of the objects that could be used to generate hotspots and hyperlinks. These and other features of Lotus Notes® are not currently found in markup language based e-mail, making it more difficult to track the usage of this type of e-mail.

SUMMARY OF THE INVENTION

Embodiments of the present invention provide a method, apparatus, and computer usable program code for using an anti-caching graphics interchange format process for tracking and reporting e-mail campaigns. An instruction set is placed in an e-mail to form a modified e-mail, wherein the data type of the field for the instruction set is set to hypertext markup language. The modified e-mail is sent to a distribution list, wherein the instruction set is executed when the modified e-mail is opened. The instruction set captures and records attributes about a reader of the modified e-mail, requests a web page at a website, passes information about the e-mail and the reader, causes a local server to request the website from an original version of the website located on an original server in response to the non-existence of the web page, causes the original server to capture relevant information about the e-mail and the reader as tracking information, and transmits the captured tracking information to a collection device.

BRIEF DESCRIPTION OF THE DRAWINGS

The novel features believed characteristic of the invention are set forth in the appended claims. The invention itself, however, as well as an illustrative mode of use, further objectives and advantages thereof, will best be understood by reference to the following detailed description of an illustrative embodiment when read in conjunction with the accompanying drawings, wherein:

FIG. 6 is an example of encoded XML representation of text in the body of a Lotus Notes® based e-mail and the underlying hyperlink, according to an illustrative embodiment of the present invention;

FIG. 7 is an example of an XML representation of a hyperlink in the body of a Lotus Notes® based e-mail with a tag added, in accordance with an illustrative embodiment of the present invention;

FIG. 8 is an example of a portion of the tagged XML representation of a URL hotspot hyperlink(s) reconverted, in accordance with an illustrative embodiment of the present invention;

FIG. 9 is an example of a flowchart for tagging items in an e-mail for tracking, in accordance with an illustrative embodiment of the present invention;

FIG. 10 is an example of a section in Lotus Notes® and the same section converted to XML, in accordance with an illustrative embodiment of the present invention;

FIG. 11 is an example of an anti-caching GIF tracking process, in accordance with an illustrative embodiment of the present invention;

FIG. 12 is an example of a portion of HTML code that is included within an e-mail that when executed indicates that the e-mail has been opened, in accordance with an illustrative embodiment of the present invention;

FIG. 13 is an example of a portion of HTML code modified to send information for a hyperlink or hotspot that may be selected within an e-mail, in accordance with an illustrative embodiment of the present invention;

FIG. 14 is an example of a portion of LotusScript® language that utilizes the Lotus Notes® C Language Application Program Interface to generate an instruction set in an e-mail to download and render the IBM logo directly from the IBM website at the time the e-mail message is opened by the e-mail recipient, in accordance with an illustrative embodiment of the present invention;

FIG. 15 is a portion of an example of placing a standard JavaScript® language instruction set within the HTML code, in accordance with an illustrative embodiment of the present invention;

DETAILED DESCRIPTION OF THE PREFERRED EMBODIMENT

Figure 1:
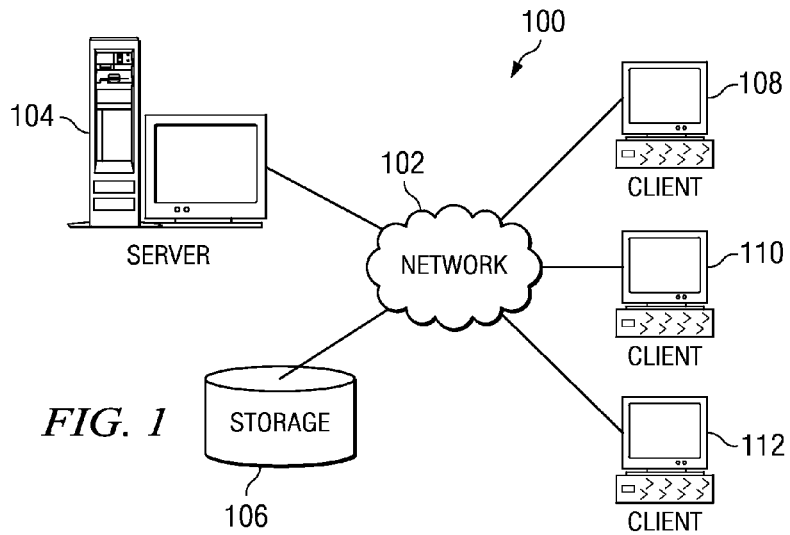
FIG. 1 is a pictorial representation of a data processing system in which the present invention may be implemented, according to an illustrative embodiment of the present invention.
Figure 2:
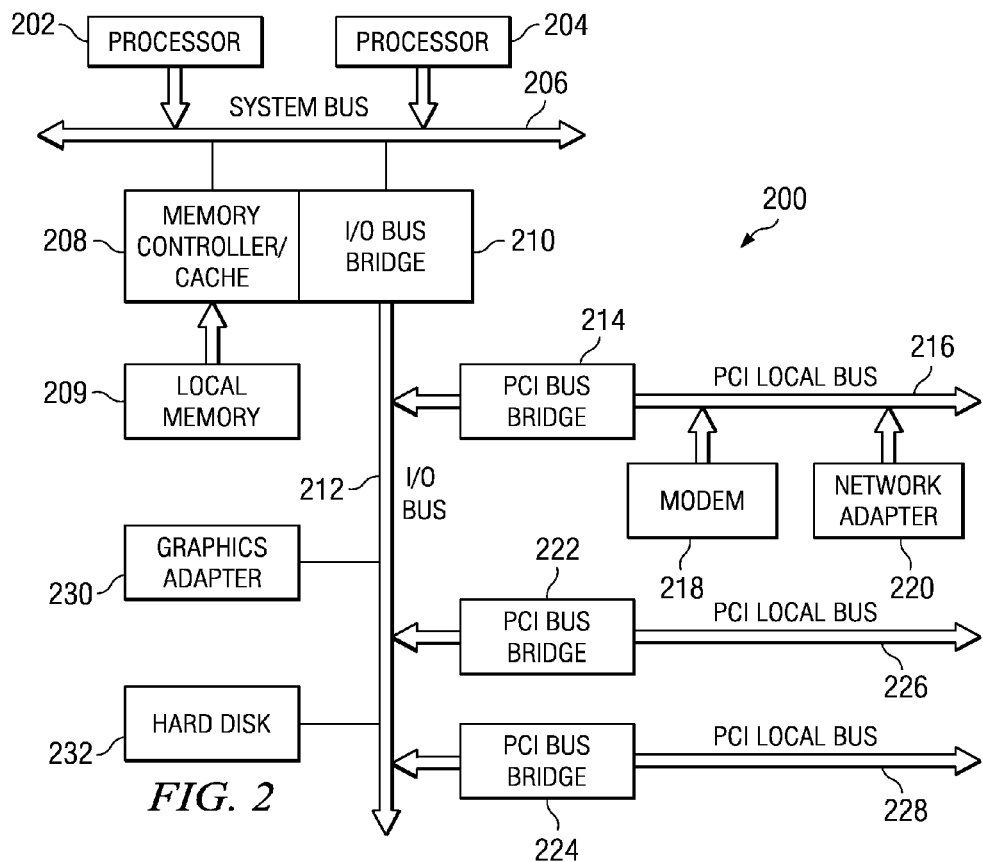
FIG. 2 is a block diagram of a data processing system that may be implemented as a server in which the present invention may be implemented, according to an illustrative embodiment of the present invention.
Figure 3:
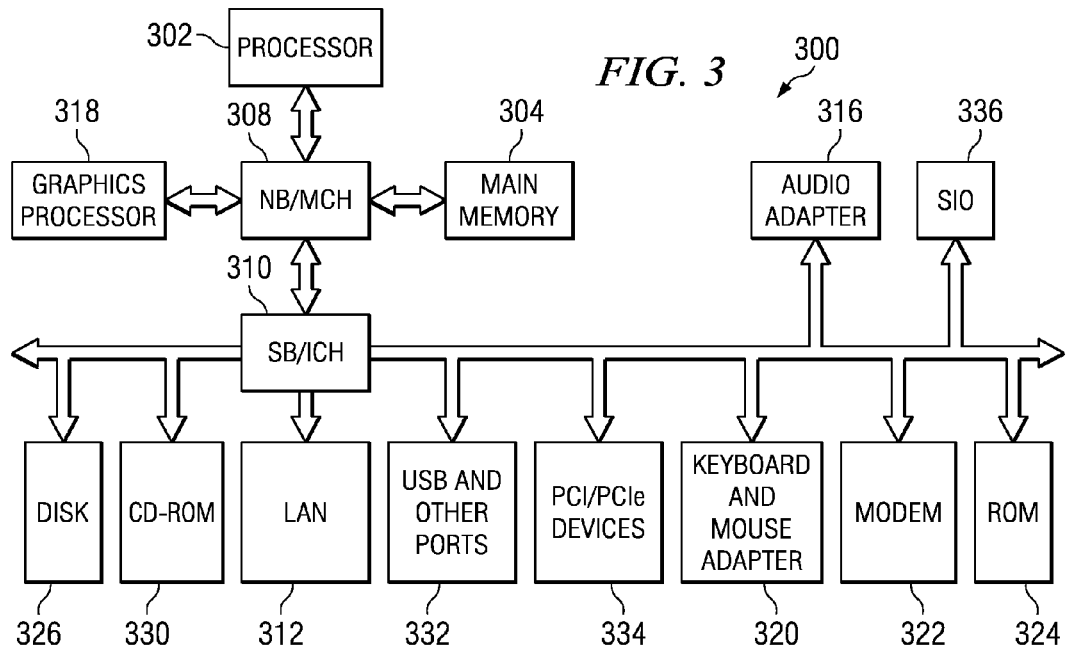
FIG. 3 is a block diagram illustrating a data processing system in which the present invention may be implemented, according to an illustrative embodiment of the present invention.

FIGS. 1-3 are provided as exemplary diagrams of data processing environments in which embodiments of the present invention may be implemented. It should be appreciated that FIGS. 1-3 are only exemplary and are not intended to assert or imply any limitations with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains a network 102, which is the medium used to provide communication links between various devices and computers connected together within network data processing system 100. Network 102 may include connections, such as wire, wireless communication links, or fiber optic cables.

In the depicted example, server 104 connects to network 102 along with storage unit 106. In addition, clients 108, 110, and 112 connect to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 that connect to system bus 206. Alternatively, a single processor system may be employed. Also connected to system bus 206 is memory controller/cache 208, which provides an interface to local memory 209. I/O bus bridge 210 connects to system bus 206 and provides an interface to I/O bus 212. Memory controller/cache 208 and I/O bus bridge 210 may be integrated as depicted.

Peripheral component interconnect (PCI) bus bridge 214 connects to I/O bus 212 provides an interface to PCI local bus 216. A number of modems may be connected to PCI local bus 216. Typical PCI bus implementations will support four PCI expansion slots or add-in connectors. Communication links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ pSeries® computer system, running the Advanced Interactive Executive (AIX®) operating system or the LINUX operating system (eServer, pSeries and AIX are trademarks of International Business Machines Corporation in the United States, other countries, or both while LINUX is a trademark of Linus Torvalds in the United States, other countries, or both).

With reference now to FIG. 3, a block diagram of a data processing system is shown in which aspects of the present invention may be implemented. Data processing system 300 is an example of a computer, such as client 108 in FIG. 1, in which code or instructions implementing the processes for embodiments of the present invention may be located. In the depicted example, data processing system 300 employs a hub architecture including a north bridge and memory controller hub (NB/MCH) 308 and a south bridge and input/output (I/O) controller hub (SB/ICH) 310. Processor 302, main memory 304, and graphics processor 318 are connected to NB/MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM drive 330, universal serial bus (USB) ports and other communications ports 332, and PCI/PCIe devices 334 connect to SB/ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). HDD 326 and CD-ROM drive 330 may use, for example, an integrated drive electronics (IDE) or serial advanced technology attachment (SATA) interface. A super I/O (SIO) device 336 may be connected to SB/ICH 310.

An operating system runs on processor 302 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 300 (Java is a trademark of Sun Microsystems, Inc. in the United States, other countries, or both).

Instructions for the operating system, the object-oriented programming system, and applications or programs are located on storage devices, such as hard disk drive 326, and may be loaded into main memory 304 for execution by processor 302. The processes for embodiments of the present invention are performed by processor 302 using computer implemented instructions, which may be located in a memory such as, for example, main memory 304, memory 324, or in one or more peripheral devices 326 and 330. These processes may be executed by any processing unit, which may contain one or more processors.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system.

As some illustrative examples, data processing system 300 may be a personal digital assistant (PDA), which is configured with flash memory to provide non-volatile memory for storing operating system files and/or user-generated data.

A bus system may be comprised of one or more buses, such as system bus 206, I/O bus 212 and PCI buses 216, 226 and 228 as shown in FIG. 2. Of course, the bus system may be implemented using any type of communication fabric or architecture that provides a transfer of data between different components or devices attached to the fabric or architecture. A communication unit may include one or more devices used to transmit and receive data, such as modem 218 or network adapter 220 of FIG. 2 or modem 322 or LAN 312 of FIG. 3. A memory may be, for example, local memory 209 or cache such as found in memory controller/cache 208 of FIG. 2 or main memory 304 of FIG. 3. A processing unit may include one or more processors or CPUs, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

To implement illustrative aspects of the present invention to track which recipients opened an e-mail and specific items in the e-mail, four processes are described in the illustrative examples. The first process is a process for tagging items such as an e-mail and the hyperlinks and attachments within the e-mail, such that when the tagged items are accessed by an e-mail reader, tagged information about the e-mail and the e-mail reader may be sent from the e-mail reader. Second, a process is employed to send tagged information in a message to a collection device in order for the tagged information to be tracked each time a tagged e-mail is opened, a tagged attachment within an e-mail is opened, or a tagged hyperlink within an e-mail is selected, despite caching effects. Third, a process is used to send tagged information in a message to a collection device each time a tagged section, an expandable area defined on an e-mail, is expanded. Fourth, a process is utilized for placing a set of instructions into an outbound e-mail at send time. These instructions are ones that are executed when the e-mail is initially opened for reading. Execution of these instructions enables the identification of the recipient in these examples.

Figure 4:
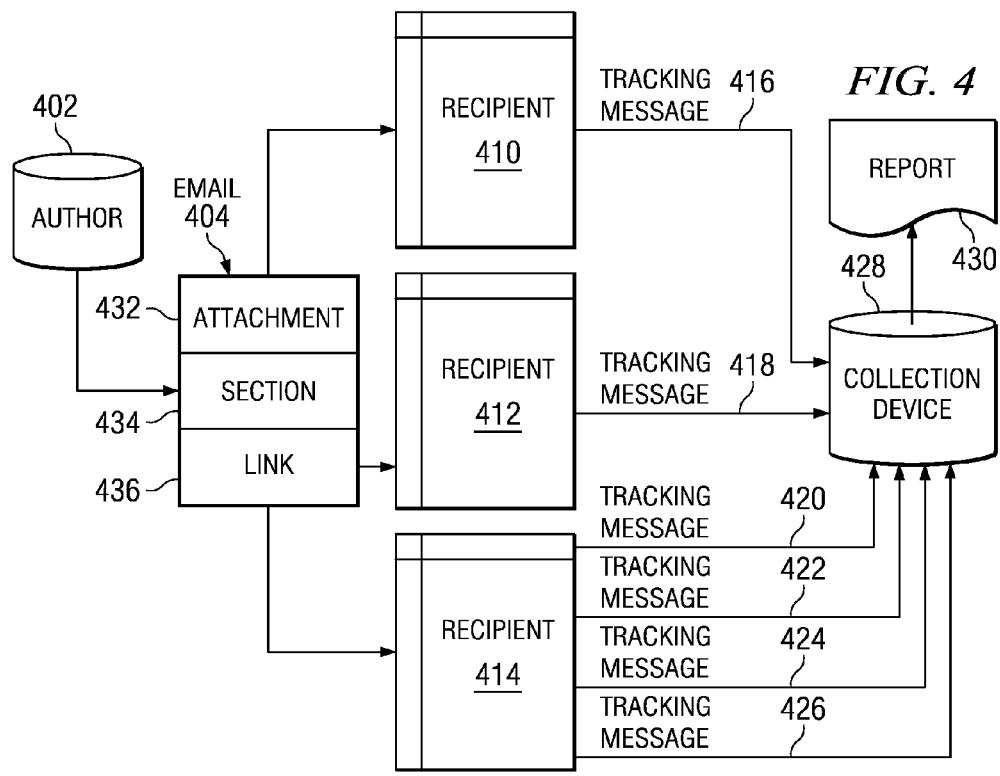
FIG. 4 is a block diagram of an exemplary e-mail tracking system in accordance with an illustrative embodiment of the present invention.

FIG. 4 is a block diagram of an exemplary e-mail tracking system, in accordance with an illustrative embodiment of the present invention. In this example, author 402 composes e-mail 404. An e-mail can have zero or more attachments, zero or more sections, and zero or more hyperlinks. Here, for purposes of illustration, e-mail 404 is shown as comprising one attachment 432, one section 434, and one link 436.

Author 402 sends e-mail 404 to a distribution list that comprises recipient 410, recipient 412, and recipient 414 in these examples. When recipient 410, recipient 412, and recipient 414 perform actions such as opening e-mail 404, opening attachment 432, expanding section 434, or selecting link 436, each recipient's action results in a tracking message being sent to collection device 428. These tracking messages are illustrated in FIG. 4 as tracking message 416, tracking message 418, tracking message 420, tracking message 422, tracking message 424, and tracking message 426. The mechanism used to gather the information in the tracking messages is described in more detail in FIG. 5.

Each tracking message contains information about how recipients respond to the contents of the e-mail. Typically the information contained in each tracking message is comprised of details about the marketing campaign and details about the recipient. The details about the marketing campaign may include data such as the subject of the e-mail, the name of the associated campaign, and information about any objects in the e-mail. The details about each recipient may include data such as the recipient's user name, the date the e-mail was opened, the time the e-mail was opened, the recipient's browser type, the recipient's e-mail client type, the level of the recipient's e-mail client, the recipient's internet sub-domain, and the recipient's transmission control protocol over Internet Protocol address.

Thus, for example, when recipient 410 opens e-mail 404, tracking message 416 informs collection device 428 that recipient 410 opened e-mail 404, and provides details about the e-mail, such as the campaign name, and details about the recipient, such as representations of the recipient's user name. Similarly, when recipient 412 opens e-mail 404, tracking message 418 informs collection device 428 that recipient 412 opened e-mail 404, and provides details about the campaign and the recipient.

When recipient 414 opens e-mail 404, tracking message 420 informs collection device 428 that recipient 414 opened e-mail 404. When recipient 414 opens attachment 432, tracking message 422 informs collection device 428 that recipient 414 opened attachment 432. When recipient 414 expands section 434, tracking message 424 informs collection device 428 that recipient 414 expanded section 434. When recipient 414 selects link 436, tracking message 426 informs collection device 428 that recipient 414 selected link 436.

Collection device 428, using information provided in tracking messages 416-426 may produce report 430. This report indicates which recipients opened e-mail 404, which recipients selected attachment 432, which recipients expanded section 434, and which recipients selected link 436. Using this method, e-mail authors can look at report 430 and determine which e-mails, attachments, sections, and hyperlinks are popular and which are not. With this information e-mail authors are able to customize future e-mails accordingly.

Figure 5:
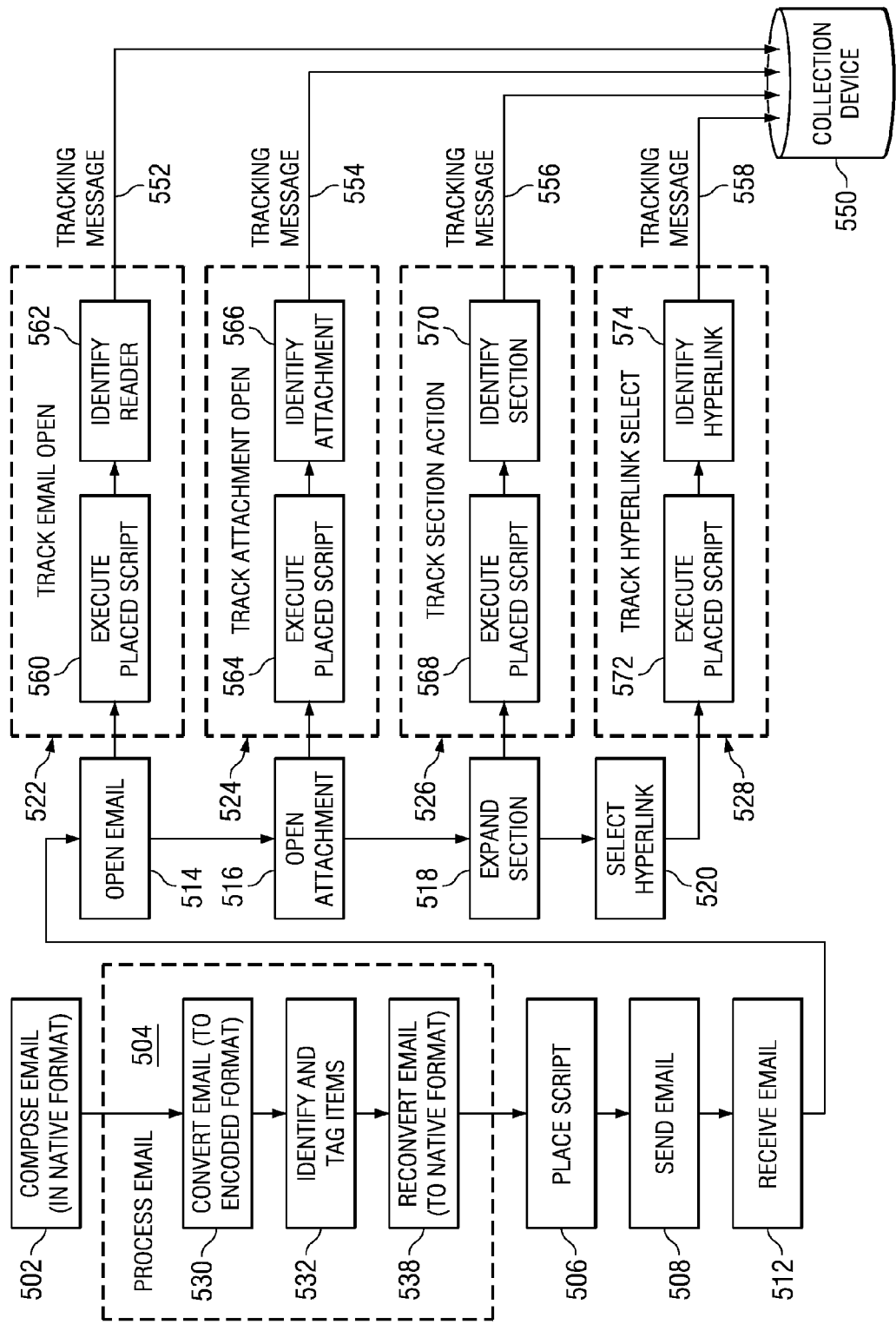
FIG. 5 is a block diagram illustrating the processing of an e-mail from creation to opening, according to an illustrative embodiment of the present invention.

FIG. 5 is a block diagram illustrating the processing of an e-mail from creation to opening in accordance with an illustrative embodiment of the present invention. An e-mail in an e-mail campaign typically has a plurality of recipients in a distribution list, but in this example only one recipient is shown to illustrate what happens when a recipient performs different actions to an e-mail. In the case of a plurality of recipients, each recipient may perform one or more of the same actions, such as opening an e-mail, opening an attachment, expanding a section, or selecting a hyperlink.

Typically, an author composes e-mail 502 using an e-mail program such as Lotus Notes®. The e-mail may have a native format such as Lotus Notes®, or hypertext markup language (HTML). It is important to note that the format that underlies the e-mail and how the e-mail appears to an author or recipient are different. For example, someone viewing the e-mail might see the sentence "For more information on our product click here", with the words "click here" displayed in a color different from the rest of the e-mail to indicate that "click here" represents a hyperlink. A hyperlink underlies the words "click here", but the viewer typically only sees "click here".

A recipient of an e-mail may perform various actions on items within the e-mail. An item is any component associated with or part of an e-mail, such as an attachment, section, or hyperlink. An attachment is a file that is sent along with an e-mail such as a document, audio file, video file, mixed media, etc. Multiple attachments of different types of files may be attached to and sent with the e-mail.

A problem with tracking Lotus Notes® based e-mail campaigns involves the use of sections. One of the most common inclusions within Lotus Notes® based e-mail is the use of sections, or, as they are commonly referred to, "twisties." Sections give the e-mail author a way or organizing different content based on his or her preference. A section is an expandable area defined on an e-mail that is also collapsible. A manipulation of a section occurs when a section is either expanded or collapsed. A section may include file attachments, images, rich text or other objects. Sections typically contain a short descriptive title of a topical area. If the reader of the e-mail is interested in a topic, the reader can select a section and expand it to view the full content, typically by using a mouse to click on the section.

The aspects of the present invention recognize that the use of sections within any e-mail creates a problem in that the e-mail author does not know if any e-mail recipients expanded and read the detailed information that followed the section summary. Nor does the e-mail author know the most popular section within any given e-mail. E-mail authors would prefer that this information be measured and reported so that campaign creators can refine, target, improve, or alter their messaging.

Some e-mail applications such as Lotus Notes® provide a feature that allows the e-mail author to create sections. A section allows the author to group similar or related e-mail content together under a section name. A section is also referred to as grouped content. The section name provides a high-level view and the reader can, by expanding a given section, view the contents of that section. The reader may also collapse a previously expanded section. A section typically has a short descriptive title of a topical area in a summary level followed by the full text in a full text level that is below the summary level. The grouped content may have more than two levels depending on the implementation. Sections may be nested within other sections.

Thus, for example, the recipient may open an attachment to the e-mail, expand a section of the e-mail, or select a hyperlink in the e-mail. In order to track the recipient's actions on items in the e-mail, process e-mail 504 identifies and adds one or more tags to each item in the e-mail.

As previously mentioned, an e-mail may contain words or graphics with underlying hyperlinks. A hyperlink is typically a specific network address and may appear in an e-mail in a variety of ways such as a set of numbers separated by a period, a web page address, or a graphic such as a company's logo.

Tags may be added to each item in the e-mail while the e-mail is in its native format. However, the aspects of the present invention recognize that the e-mail's native format might not allow easy access to the items in the e-mail, making it difficult to access and add tags to the e-mail in its native format. Another method of tagging items, illustrated here, is to first convert the e-mail from its native format to an encoded format that is easier to parse. For example, by converting a Lotus Notes® native format e-mail to extensible markup language (XML), the XML may be quickly parsed and items such as attachments, sections, and hyperlinks easily identified and tagged.

In this example, process e-mail 504 is an e-mail processor that converts compose e-mail 502 from the e-mail's native format to an encoded format in convert e-mail 530. The native format may display a hyperlink as the words "click here" or a logo. The e-mail's encoded format may be in the form of a markup language such as XML. In identify and tag items 532, process e-mail 504 parses the encoded e-mail, identifies items such as attachments, sections, and hyperlinks, and tags them. Once the entire e-mail has been parsed and all items have been identified and tagged, process e-mail 504 reconverts the encoded and tagged e-mail back to native format in reconvert e-mail 538. Thus the reconverted web page will appear in the e-mail as it did prior to conversion.

The e-mail is converted from a native format to a format such as XML so that the entire e-mail can be quickly parsed and tags placed in appropriate places for tracking recipient's actions. Aspects of the present invention recognize that if the e-mail was not converted to a format such as XML, navigating the e-mail for the purpose of adding tags would be much slower and more difficult.

A document in XML format can be easily parsed because it is comprised of nodes organized in a hierarchical tree-like structure starting with a root node. Each node typically contains markup and content. The markup provides information about the content it surrounds.

In XML, an element is the most common form of markup. Each element is delimited by angle brackets and identifies the nature of the content it surrounds. For example, <name>Mike</name> has content "Mike" and the element indicates that "Mike" is a name. Note how XML uses <name> to indicate the start of the content and </name> to indicate the end of the content. The elements in an XML document thus provide a way to quickly and easily identify those portions of the e-mail an author is interested in tracking.

Another reason for using a format such as XML is because many e-mail programs offer utilities for converting an e-mail to and from XML format. These utilities allow an e-mail to be converted from its native format to XML, parsed and tagged, and reconverted back to its native format so quickly that the entire process is transparent to the user.

Thus, for example, process e-mail 504 may be written in a LotusScript® language code that converts an e-mail in Lotus Notes® format to XML and back again. First, the LotusScript® language code converts the e-mail from Lotus Notes® format to XML format. One method of doing this conversion is the "CreateDocumentParser" method which does the conversion entirely in memory—no physical input or output is performed. Next, the e-mail in XML format is parsed and tags are added where required by examining each node for specific elements such as hyperlinks. Finally, the LotusScript® language code invokes the Domino Extensible Language (DXL) utility of Lotus Notes® to convert the document in memory back to Lotus Notes® format. Because the conversion from Lotus Notes® format to XML format and back again to Lotus Notes® format is done in memory, the conversion is fast, almost instantaneous, and transparent to the user. This conversion process also preserves the authenticity and items such as digital signatures or encryption settings while the process of XML conversion and tagging is performed by the author of the e-mail.

An author may specify which items to track and tag. Tags are thus added to items the author is interested in tracking, such as attachments, sections, and hyperlinks. In addition to identifying items, a mechanism for sending a tracking message when a recipient performs an action to an e-mail is needed. In this example, a placed script is the mechanism used in these illustrative examples to send a tracking message when a recipient performs an action to the e-mail. The script is placed into the e-mail in place script 506.

Once the script is placed, the e-mail is sent in send e-mail 508. A recipient receives the e-mail in receive e-mail 512. An e-mail campaign typically has multiple recipients in a distribution list; however only one recipient is shown in FIG. 5 in order to illustrate the actions one recipient may perform on an e-mail. A recipient may open the e-mail, open one or more attachments to the e-mail, expand or collapse one or more sections of the e-mail, and select one or more hyperlinks in an e-mail.

In this example, the recipient opens the e-mail in open e-mail 514, opens an attachment in open attachment 516, expands a section in expand section 518, and selects a hyperlink in select hyperlink 520. Note that a recipient need not do any of these actions, may do a subset of these actions, or may do these actions in a different order. The recipient's actions and the order in which they are performed here are purely for purposes of illustration and should not be construed as limiting the present invention in any way.

When the recipient opens the e-mail in open e-mail 514, track e-mail open 522 executes placed script 560. In this example, a recipient who opens an e-mail is referred to as a reader. Placed script 560 identifies the reader in identify reader 562 and sends tracking message 552 with the reader's identity to collection device 550. The reader's identity may include the reader's user name, browser type, client type, level of e-mail client, Internet sub-domain (which could be used to determine company or workplace), Transmission Control Protocol/Internet Protocol (TCP/IP) address (which may be used to indirectly indicate country or geographic region), and whether the reader used a replica mailbox database or whether the reader used a master mailbox database. Typically, the placed script, in addition to identifying the reader, also provides the e-mail's identity in tracking message 552.

When the recipient opens an e-mail attachment in open attachment 516, track attachment open 524 executes placed script 564, identify attachment 566, and sends tracking message 554 with the attachment's identity to collection device 550. Typically, the placed script, in addition to identifying the attachment, also provides the reader's identity in tracking message 554.

Track section action 526 tracks any action a reader performs on a section, such as expanding or collapsing a section. Typically an author is interested in which sections a reader expanded because expanding a section indicates that the reader was interested in reading more about the topic in the section header. Expand section 518 is an example of one action a reader can perform on a section.

Track section action 526 may be implemented as follows. When the recipient performs an action to a section of the e-mail such as expand section 518, track section action 526 executes placed script 568, identify section 570 and sends tracking message 556 with the section identity to collection device 550. Typically, the placed script, in addition to identifying the attachment, also provides the reader's identity in tracking message 554. Other actions the reader performs to a section, such as collapsing a section, may also be tracked if the author desires, using track section action 526.

When the recipient selects a hyperlink in the e-mail in select hyperlink 520, track hyperlink select 528 executes placed script 572 which results in a URL link call, identify hyperlink 574, and sends tracking message 558 with the hyperlink's identity to collection device 550. Typically, the placed script, in addition to identifying the attachment, also provides the reader's identity in tracking message 558.

As the preceding example illustrates, the placed script in the e-mail, in conjunction with the tagged items in the e-mail, allow an author to track the different actions recipients perform on the author's e-mail after it has been sent. Collection device 550 can generate reports detailing the type of recipients that opened the e-mail and different items in the e-mail.

An e-mail in a native format such as Lotus Notes® may contain the text "Support & downloads" and a corresponding underlying hyperlink which is the web page the viewer is taken to if the viewer clicks on the displayed text. The hyperlink is displayed in the form of the text "Support & downloads" using various formatting characters specific to the native format, but the underlying hyperlink remains in the form of an HTTP address.

When the e-mail in native format is converted from native format to an encoded format such as XML, the underlying hyperlink is not modified. The conversion from native format to encoded format involves taking the e-mail as it appears in the native format and describing that appearance using the encoded format.

Thus, the hyperlink underlying the text "Support & downloads" in the native format e-mail remains an HTTP hyperlink in the XML format e-mail. After the conversion, the XML format e-mail displays the text "Support & downloads" with the underlying hyperlink, just as the native format e-mail displayed it before the conversion.

Specifically, if the native format e-mail displays "Support & downloads" using a particular font type, size, and color, the encoded format e-mail will display "Support & downloads" using the same font type, size, and color used by the native format e-mail. The hyperlink underlying "Support & downloads" remains the same, and is unaffected by the conversion. The use of an encoded format allows the e-mail to be quickly parsed to identify each hyperlink. For example in XML, each hyperlink is preceded by "href=" to indicate a hyperlink reference.

When tags are added to the e-mail in encoded format, these tags containing information about the campaign and an instruction set to identify the recipient are added after the hyperlink address as standard parameters associated with web based URL's. This process is described in more detail below. The important point to note is that the hyperlink address itself is not modified.

When the e-mail in encoded format with tags is converted back to the native format, the native format e-mail appears as it did before conversion, except that the underlying hyperlink now has one or more tags added for each item. After the entire process of conversion from native format to encoded format and back to native format is completed, the hyperlink is still displayed as the text "Support & downloads," with the difference being that tags have been added to the underlying hyperlink. In illustrative embodiments of the present invention, the re-conversion back to native format is done by finding the hyperlink with tags in the encoded format and substituting the hyperlink with tags for the hyperlink in the original native format e-mail.

FIG. 6 is an example of an XML representation of text in the body of a Lotus Notes® based e-mail in accordance with an illustrative embodiment of the present invention. This figure is an example of how text and the corresponding underlying hyperlink in an e-mail may look like after being converted to encoded format in step 530 of process e-mail 504 in FIG. 5. An HTTP hyperlink for a web page translated into XML may look like the example shown in FIG. 6. In this example, XML label 602 "href=" indicates a hyperlink reference. Web page 604 is the web page the user is taken to when the user clicks on the hyperlink. Corresponding to the hyperlink is text to be displayed 606 "Support & downloads," which is the text displayed for the viewer to see. Display characteristics 608 specifies how the text appears to the viewer in terms of the type of font, font style, size, color, etc. In this example, display characteristics 608 specifies that text to be displayed 606 should be displayed using a 12 point, bold, Verdana font.

Typically, the hyperlink is displayed in a manner that makes it easy for a recipient to navigate to or to locate content on a website. The hyperlink may be displayed in a variety of ways, including text or graphics.

FIG. 7 is an example of an XML representation of a hyperlink underlying text or graphics in the body of a Lotus Notes® based e-mail with a tag added in accordance with an illustrative embodiment of the present invention. This figure is an example of what a hyperlink underlying text or graphics in an e-mail may look like after process e-mail 504 in step 532 identifies and tags e-mail items as described in FIG. 5. Other items in an e-mail such as an attachment or section are similarly tagged.

In this example, the e-mail containing the underlying hyperlink has been tagged with tracking website "www.website_generic.com", and with information regarding the campaign. XML label 702 indicates that what follows it is a hyperlink. Web page 704 is the web page the user is taken to if the user clicks on the hyperlink. Tracking website 706 is added to the hyperlink as a tag and is the mechanism used to identify each e-mail recipient when the e-mail recipient performs an action on the e-mail such as clicking on a hyperlink, expanding a section, and opening an attachment. Campaign information 708 is also added as a tag to the hyperlink in order to provide details regarding the e-mail campaign, such as the campaign_group_name, author's_name, campaign_name, distribution_list used, etc. Note that in this example, tracking website 706 is pre-pended to the hyperlink while campaign information 708 is appended to the hyperlink.

Text to be displayed 710 "Support & downloads" is the text used to display the hyperlink to the viewer. Display characteristics 608 in FIG. 6 specifies how the text is displayed to the viewer in terms of the font type, style, size, color, etc.

The XML representation of the e-mail is easy to navigate and tag because e-mail items are easily identified. For example, all underlying hyperlink references in the XML representation of the e-mail will typically be preceded by the XML identifier "href=". This identifier allows process e-mail 504 to quickly parse the XML encoded e-mail and add the appropriate tags. The entire process of converting the e-mail to encoded format, tagging the underlying items in the e-mail, and reconverting the e-mail back to native format is done very quickly using the method disclosed by the present invention and is transparent to the author or other person sending the e-mail.

FIG. 8 is an example of a portion of the tagged XML representation of a URL hotspot hyperlink(s) reconverted in accordance with an illustrative embodiment of the present invention. This figure is an example of what an HTML hyperlink underlying text or graphics in an e-mail may look like after process e-mail 504 in step 538 reconverts a tagged XML representation back to a native format such as Lotus Notes® in FIG. 5. In this example, web page 802 "www.website_name.com/page_no" still contains the tags added to the e-mail in XML format, such as tracking website 804 and campaign information 806, but the XML labels such as "href" and "urllink" are no longer present. Note that the hyperlink is still displayed to viewers as "Support & downloads" as before, but the hyperlink now contains tags.

FIG. 9 is an example of a flowchart for tagging items in an e-mail for tracking in accordance with an illustrative embodiment of the present invention. The process illustrated in FIG. 9 may be implemented in a language such as, for example, LotusScript® language, using the Lotus Notes® Domino Extensible Markup Language (DXL) utilities. Once an author has composed an e-mail but before the author has sent it to the intended recipients, an e-mail processor receives the author's e-mail in native format (step 902).

The e-mail processor next converts the e-mail from native format to encoded format (step 904). If a script language such as LotusScript® language is used to perform the conversion, a method such as "CreateDocumentParser" may be used to perform the conversion entirely in memory without any input or output required.

For example, the text "Support & downloads" may be displayed in a certain way by the native format, and have a corresponding hyperlink. When encoded, the text "Support & downloads" in encoded format appears to the viewer the same as the native format did, and uses the same underlying hyperlink. The encoded representation allows the entire e-mail to be quickly parsed, so that tags can be added to items in the e-mail that the author is interested in tracking.

The e-mail processor then finds the first item in the e-mail (step 906). The e-mail processor determines if the item it found in the e-mail is a hyperlink (step 908).

If the item is determined to be a hyperlink, the e-mail processor adds a tag to the hyperlink (step 910) and then determines whether the end of the e-mail has been reached (step 920). If the end of the e-mail has not been reached (step 920), then the e-mail processor looks for the next item in the e-mail (step 906).

If the item is determined not to be a hyperlink (step 908), then the e-mail processor determines if the item is an attachment, such as a Portable Document Format (PDF) document (step 912). If the item is determined to be an attachment, then the e-mail processor adds a tag to the attachment (step 914) and then determines whether the end of the e-mail has been reached (step 920). If the end of the e-mail has not been reached (step 920), then the e-mail processor looks for the next item in the e-mail (step 906).

If the item is determined not to be an attachment (step 912), then the e-mail processor determines if the item is a section (step 916). If the item is determined to be a section then the e-mail processor adds a tag to the section (step 918) and then determines whether the end of the e-mail has been reached (step 920). If the end of the e-mail has not been reached (step 920), then the e-mail processor looks for the next item in the e-mail (step 906).

If the e-mail processor determines that the end of the e-mail has been reached (step 920), then the e-mail processor reconverts the e-mail back to native format (step 922) because the e-mail processor has parsed the entire e-mail and tagged all items in the e-mail. Typically, a script language such as LotusScript® language, using calls to DXL utilities, performs the conversion back to native format. Once the e-mail processor has completed reconverting the e-mail back to native format the e-mail is typically sent to the intended recipients on the distribution list.

FIG. 10 is an example of a section in Lotus Notes® and the same section converted to XML, in accordance with an illustrative embodiment of the present invention. Section title 1002 is the title of the section. Section contents 1004 is the contents of the section. Section expansion indicator 1006 indicates whether the section has been expanded to display the contents of the section.

Together, section title 1002, section contents 1004, and section expansion indicator 1006 show how the section and its contents appear in an encoded format such as Lotus Notes®. Section in XML format 1008 illustrates section title 1002, section expansion indicator 1006 and section contents 1004, after conversion to XML.

When the tagged items are accessed by an e-mail reader, a process is needed to send this tagged information to a collection device in order for the tagged information to be tracked.

As a point of comparison for the tracking of e-mails, numerous websites around the world use a tracking technology on their pages to monitor and analyze website usage. The technology is based on code in JavaScript® language and revolves around the placement of a Graphics Interchange Format (GIF) image on every web page that is to be monitored. As web browsers load and render a website's web pages, the GIF image resource is requested by the browser, which in turn makes a call to specific JavaScript® language code that includes the code required to capture and record attributes such as the Internet Protocol (IP) address, browser type, Internet sub-domain, and other information of the user visiting the website.

This methodology is commonly referred to by several names, the most common being "single pixel," "clear gif," "one pixel," "web beacon," and "web bug." Essentially all these types of this methodology perform the same task, but each may be invoked differently or placed uniquely on the website based on the server type, the website technology, the page construction, or other factors. The most common drawback to this technology is caused by the effect of caching within the Internet and also by the various devices attempting to accelerate delivery of web page content, such that an end user accesses a cached local copy of a desired web page instead of accessing the original website. The effect of caching essentially skews the tracking results in terms of accuracy of the number of actual website views to a given original website.

The aspects of the present invention uses an anti-caching GIF tracking process that is a variant of this GIF tracking technology to address the accuracy problem in regards to skewed results due to caching. In addition to tracking website views to the original website, an anti-caching GIF tracking process requests a non-existent web page at a website in the cached local copies, forcing attempts to request a cached local copy to be re-directed to visit the original website.

The aspects of the present invention recognize that differences exist between websites and e-mails in relation to using an anti-caching GIF tracking process to monitor and report on Lotus Notes® based e-mails. E-mails are not a collection of web pages on a website. Rather, e-mails are an unpredictable collection of messages in terms of frequency, content, topic, author, and other factors. In contrast to a user visiting a website, e-mails are typically delivered to a user's mailbox. Users typically use web browsers to visit websites, but e-mail has numerous clients and architectures that may not be web browser based.

One premise behind the GIF technology and the process of anti-caching GIF tracking variants used in the illustrative embodiments of the present invention assume that when individuals visit websites, the browser, in its attempt to render a web page at the website, will execute the JavaScript® language code associated with the call to the GIF image. In contrast, an e-mail is delivered to a given in-box or mailbox on a server. Typically no GIF call is associated with the e-mail. E-mail users navigate their in-basket in their in-box or mailbox, and may open, read, reply, re-read, forward, delete, or file away any e-mail. The actions typically performed by e-mail users are very different from the actions typically performed by users who visit a website.

Some illustrative embodiments of the present invention leverage an anti-caching GIF tracking process by calling it by executing a placed instruction set from within any given e-mail. The calling sequence from the Lotus Notes® e-mail client additionally passes to the GIF JavaScript® language code relevant information about the e-mail in the form of parameters, such as the date the e-mail was opened or pre-viewed, the time the e-mail was opened or previewed, the user name, the browser type, the client type, the level of the e-mail client, the subject of the e-mail, the name of the associated campaign, whether the reader used a replica mailbox database, whether the reader used a master mailbox database, the Internet sub-domain, the TCP/IP address, and other information about the reader who opened the e-mail, essentially duplicating and supplementing what the JavaScript® language code would normally capture when a user visits a web page on a website. Pre-viewing an e-mail is similar to opening an e-mail, but pre-viewing occurs in a "read only" mode, whereas opening occurs in an edit mode. Opening an e-mail provides the reader with options such as forwarding the e-mail, replying to the e-mail, saving the e-mail, and deleting the e-mail, options not available to a reader that pre-views an e-mail. Any and all information about the e-mail may be analyzed to determine if there is statistical correlation between any category based on this information and readers of a particular e-mail.

FIG. 11 is an example of an anti-caching GIF tracking process, in accordance with an illustrative embodiment of the present invention. Original version of a website 1102 is located on server 1104, and cached local copy of the website 1106 is located on server 1108. When client 1110 selects hyperlink 1114 in e-mail 1116 to request a web page, search engine 1118 may determine that the closest copy of the web page should be at cached local copy of the website 1106 located on server 1108. Because the requested web page does not exist in cached local copy of website 1106 located on server 1108, the anti-caching GIF tracking process placed as an instruction set in the non-HTML e-mail causes the request for the web page to be redirected as a request for the website. To satisfy the resulting redirected website request of client 1110, server 1108 requests the website from original version of the website 1102 located on server 1104. This forwarded website request to server 1104 executes an anti-caching GIF tracking process placed as an instruction set in the non-HTML e-mail to track the request of client 1110 for original version of a website 1102 located on server 1104 by capturing tracking information and transmitting the tracking information to collection device 1112. Therefore, the anti-caching GIF tracking process placed as an instruction set in the non-HTML e-mail captures all the requests made for a website and transmits the tracking information to a collection device, regardless of whether the request was made to the original version on a server or a cached local copy on another server.

Various types of calls are preset in these examples, each resulting in a different type of information being sent to a designated collection device. One call indicates that the e-mail was opened by the recipient. Multiple occurrences of the open record can be used to compute the number of readers who opened the e-mail once, a unique open, and the number of readers who opened the e-mail repeatedly, repeat opens. Another call indicates that either a specific hyperlink or hotspot was selected within the e-mail.

In addition to the ability to solve the tracking problem associated with caching, the anti-caching GIF tracking process in the illustrative examples may be used with Lotus Notes® based e-mails. When used with Lotus Notes®, the illustrative embodiments of the present invention support both e-mails from a Lotus Notes® e-mail client to a Lotus Notes® e-mail client and e-mails between a Lotus Notes® e-mail client and any HTML or JavaScript® language compliant e-mail client. Aspects of the present invention recognize that no current e-mail facility exists that utilizes an anti-caching GIF tracking process or tracks Lotus Notes® based e-mail clients. The process of the present invention is transparent to both the e-mail recipient and the operating system platform.

The inclusion of a call within the e-mail to an anti-caching GIF tracking process makes the process possible. To make the call to the GIF JavaScript® language code, an instruction set of HTML code needs to be placed in each e-mail that needs to be tracked.

FIG. 12 is an example of a portion of HTML code that is included within an e-mail that when executed indicates that the e-mail has been opened. If parameters need to be passed for additional analysis or reporting purposes, example HTML code 1200, which contains a reference to URL 1202, may be modified and additional parameters added after the GIF call. Parameter "e-mail_opens" 1204 is used by an analysis routine to indicate the opening of the e-mail.

FIG. 13 is an example of a portion of HTML code modified to send information for a hyperlink or hotspot that may be selected within an e-mail, in accordance with an illustrative embodiment of the present invention. The HTML code for identifying and tracking is modified slightly to become something similar to an example of a portion of code 1300. URL 1302, used for example purposes, is a reference to the IBM logo on IBM's homepage.

The use of an anti-caching GIF tracking process in the illustrative examples makes it possible to identify readers of e-mail and both track and report on their e-mail usage. In particular, e-mail that originates from a Lotus Notes® based e-mail system can be readily tagged, tracked, and reported on, a unique capability to make e-mail usage information available.

In addition to providing for the identifying and tracking of e-mail opening, attachment opening, and hyperlink selecting, the illustrative embodiments of the present invention provide for identifying and tracking of section expansion in Lotus Notes® based e-mail campaigns, capitalizing on properties that all Lotus Notes® sections have. The ability to identify and track section expansion relies on the state of each section, and is further divided into two more abilities: the ability to identify and track any or all section expansion within a Lotus Notes® based e-mail, and the ability to collect, process, analyze, and report on section related information.

Similar to information about the opening of e-mails, and information about the selecting of hyperlinks and attachments, section related information can be used by advertisers and marketers, authors of newsletters, or any author of an e-mail containing sections to better target their audiences. This information allows for additional insight into the readership of an e-mail, an attachment to an e-mail, and a hyperlink or section in any given e-mail. Beyond knowing which e-mail, attachment, hyperlink, and section was read, the authors of e-mails also want to know if any e-mails, attachments, hyperlinks, and sections are the most popular or if the population of recipients continues to come back and read an e-mail, attachment, hyperlink, or section multiple times, treating it as a reference material.

Other information that may also be inferred includes the customer or audience type, based on the e-mail author's categorization or segmentation of any population based upon reader responses, such as financial industry, high tech industry, chemical industry, homemaker category, student category, or retail category. This information makes it is possible to correlate user type to e-mail, attachment, hyperlink, and section related information based on topical areas. Additionally, given TCP/IP addresses and Internet sub-domains may be analyzed to determine if there is statistical correlation between readers of a particular TCP/IP address or Internet sub-domain and the topic of an e-mail, attachment, hyperlink, or section.

The ability to identify and track the expansion of sections allows the author of a Lotus Notes® based e-mail to learn a significant amount about their readers without spending additional investments on specific surveys or additional materials. The section identifying and tracking process is transparent to the end user and requires no special configuration by the author or the Lotus Notes® Client. The section identifying and tracking process is also inherent within the e-mail itself, further allowing for inclusion and protection of digital signatures and author authenticity.

All sections within Lotus Notes® based e-mail have two states, an expanded state and a collapsed state. In addition, every section has the capability to contain a descriptive title specified by the author and also the capability for the title to be derived or generated based on a formula using the Lotus Notes® formula language. An example of a title delivered based on a formula is a salutation using the e-mail recipient's name. These section header titles may be hidden if the section is expanded. In addition to these capabilities, Lotus Notes® internally contains the identification, style, and color or every section. It is possible to leverage all of this information, even in the event a section title is blank or omitted, or if sections are nested within one another, to determine response rates to factors other than the title.

Leveraging this information, it is then possible for every section to be associated with a placed instruction set that contacts a collection device and communicates appropriate information, with the placed instruction set being executed each time a section is expanded. The assumption is that all sections within any e-mail are collapsed when originally sent by an e-mail author or originally received by an e-mail recipient. Upon the expanding (or collapsing) of any section by the e-mail recipient, the placed instruction set in the section may communicate the title of the section, the date the section was expanded (or collapsed), the time the section was expanded (or collapsed), the user name, the browser, the client type, the level of the e-mail client, the subject of the e-mail, the name of the associated campaign, whether the reader used a replica mailbox database, whether the reader used a master mailbox database, the Internet sub-domain, the TCP/IP address, and other parameters to a collection device.

Based on information being gathered at the collection device, the collection device may analyze and report on the number of times a particular e-mail is opened, a hyperlink is selected, an attachment is opened, and a section is expanded (to be read) in order to support the popularity indexes. The collection device may correlate the date and time an e-mail was opened, an attachment or hyperlink selected, or a section expanded, with an e-mail, attachment, hyperlink, or section to generate a reference type index value and correlation based on a frequency of the e-mail, attachment, hyperlink, or section being viewed over time. In addition, it is possible to cross-reference and correlate TCP/IP addresses (or Internet sub-domain) to the e-mail, attachment, hyperlink, or section to analyze any particular correlations between these categories and the subject of the e-mail, attachment or hyperlink, or the title of a given section.

In order for information to be sent in a message to a collection device each time an e-mail is opened, a process is needed for placing a set of instructions into an outbound e-mail at send time, instructions that are executed when the e-mail is initially opened for viewing, enabling the identification of the recipient.

The illustrative embodiments of the present invention provide for determining reader identity in a Lotus Notes® based e-mail campaign. In order to track identification information of a reader, the reader of a given e-mail needs to be identified and a determination made if this reader was a new reader or a repeat reader. Given that e-mails may be sent to distribution lists that may or may not exist within a local address book, and that a distribution list may contain nested distribution lists, aspects of the present invention recognize that a requirement exists to uniquely identify a reader of a given e-mail as a unique reader or a repeat reader.

This requirement calls for the inclusion of a set of instructions that are placed into an outbound e-mail at the time the e-mail is sent. Independent of where in a Lotus Notes® e-mail network the e-mail is sent, whether to an individual, a distribution list, or a nested distribution list, the placed instruction set contains the necessary intelligence and is executed at the time the e-mail is actually opened or previewed on the receiving end. The placed instruction set is executed at open time or preview time, allowing for the identification of the individual that read the e-mail, confirming that the e-mail was read. Once executed, the placed instruction set may send information to a collection device, possibly including the date the e-mail was opened or previewed, the time the e-mail was opened or previewed, the subject of the e-mail, the name of the associated campaign, the user name, the browser type, the e-mail client type and level, whether the reader used a replica mailbox database, whether the reader used a master mailbox database, the Internet sub-domain, and the TCP/IP address. By processing the collected information, repeat readers and unique readers can be easily determined and usage data on these readers analyzed.

In addition to confirming that the e-mail was opened or previewed, the placed instruction set also contains attributes about the e-mail in terms of time of day the e-mail was read, the e-mail subject, the name of the associated campaign, their IP address, the level of the Lotus Notes® Client, whether the recipient used a replica or a master mailbox database, and other parameters of interest.

Because the placed instruction set is part of the e-mail message, the placed instruction set is executed every time the mail message is opened, further allowing the determination of unique or repeat readers.

The placed instruction set can be inserted and customized by the end user and does not require a modification to a corporate mail template. The placed instruction set uses existing fields that every Lotus Notes® based e-mail contains. Because the placed instruction set is inserted by the original author of the e-mail, the authenticity, encryption, and digital signatures of the original author are fully preserved.

The placed instruction set is part of the e-mail message and is transparent to the e-mail's recipients and readers, giving no indication to the e-mail's recipients and readers that the message has tracking capability.

Unlike conventional HTML based e-mails where unique e-mails are created for every user on a given distribution list, the placed instruction set works with e-mail distribution lists, or nested distribution lists. A unique e-mail is created for every server on a given distribution list, not for every user. This limited creation of e-mails significantly reduces the network traffic and the volume of e-mails sent. Furthermore, because some distribution lists may or may not exist within a local address book, aspects of the present invention recognize that an e-mail author may not have the names or addresses of each individual recipient on the distribution list. The author's lack of an individualized list becomes more pronounced when a distribution list contains nested distribution lists.

For example, if an e-mail author sends an e-mail to a distribution list specified as "IBM employees," the e-mail author may not know who is on the IBM employees' distribution list or even how many e-mail addresses are in the IBM employees' distribution list. If there are, for example, 10,000 IBM employees and their e-mail addresses may be accessed through 10 servers, instead of 10,000 copies of the e-mail created by the e-mail author being sent, only 10 e-mail copies are sent, 1 to each server. Each of the 10 e-mail copies contains the placed instruction set, such that if any of the 10,000 IBM employees opens the e-mail, the placed code uniquely identifies the employee by a representation of the employee's e-mail address. Furthermore, if an IBM employee opens the e-mail repeatedly, the placed instruction set in the e-mail uniquely identifies the employee as a repeat reader, tracking each occasion the employee read the e-mail.

Aspects of the present invention recognize that neither "Return Receipt" nor "Delivery Acknowledgement" is a valid methodology for the specified purposes. Neither of these methodologies is robust enough or reliable enough across disparate mail networks or servers in terms of what data they can provide. Essentially, they only provide confirmation of e-mail delivery to the server and not necessarily an indication of actual reading of the e-mail message by individual recipients. These methodologies do not execute every time the e-mail is read, they can be disabled, and they are not reliable when communicating across multiple e-mail networks.

Every Lotus Notes® e-mail message has a field called the "Body" field. The Body field is the core of any e-mail message, and carries the contents of all e-mail messages. The Body field for Lotus Notes® based e-mail is of a type called RichText. Essentially, RichText enables Lotus Notes® to allow multiple types (images, colors, fonts, formatting, graphics, applets, etc.) to be placed within the same field for the purpose of e-mail messages. The internal architecture of RichText based e-mails may actually contain many instances of the Body field, along with references to file attachments (not physically in the body of the e-mail), hyperlinks (in the body of the e-mail), sections, (in the body of the e-mail), or other objects (in the body of the e-mail), formatting, etc.

The placed instruction set may use the Body field because the Body field is universal to all Lotus Notes® e-mail messages and also because the format is RichText. A placed instruction set is included at the end of the Body field. The one critical difference between the placed instruction set and the typical content of an e-mail is the data type of the field being set to HTML for the placed instruction set, because RichText by itself is not executable in terms of allowing the e-mail client to execute an instruction set. The Body field can contain hyperlinks, sections, or other objects in addition to normal text and formatting, or point to attachments, but all of these must be launched independently and executed externally.

The placed instruction set is coded in traditional HTML, which may also contain a standard JavaScript® language instruction set. The significance of the data type HTML is it allows objects being referenced by the Lotus Notes® client to be executed instead of displaying the objects as part of the e-mail message, and HTML is the default language used by web browsers and other e-mail clients to render e-mail messages and display both images and associated objects.

The process of placing the instruction set in an outbound e-mail before send time requires the use of JavaScript® language or LotusScript® language to call a Lotus Notes® C Language Application Program Interface (C-API), which in turn has access to the e-mail's internal data structure, such that the C-API can place the instruction set as required.

FIG. 14 is an example of a portion of LotusScript® language that utilizes the C-API to generate an instruction set in an e-mail to download and render the IBM logo directly from the IBM website at the time the e-mail message is opened by the e-mail recipient. The example of LotusScript® language 1400 places the appropriate HTML instruction set 1402 that causes the Lotus Notes® e-mail client to download and render the IBM logo 1404.

In addition to these capabilities, the above logic also allows for the placing of standard JavaScript® language instruction set 1502 within HTML code 1500, using a traditional calling sequence such as the example of a portion in FIG. 15. The significance is that any valid JavaScript® language instruction set can be placed as part of the e-mail message. The Lotus Notes® Client displays the rest of the e-mail normally and when specific placed instruction set 1502 is encountered, the Lotus Notes® Client executes placed instruction set 1502, given that the data type of the placed instruction set is HTML, not RichText. This capability allows placed instruction set 1502 to capture all the attributes about the recipient and client at the time the mail is read. The execution of placed instruction set 1502 of JavaScript® language from within a Lotus Notes® Client may raise Execution Control List (ECL) warning messages, depending on the end user presence settings and ECL levels.

Figure 16:
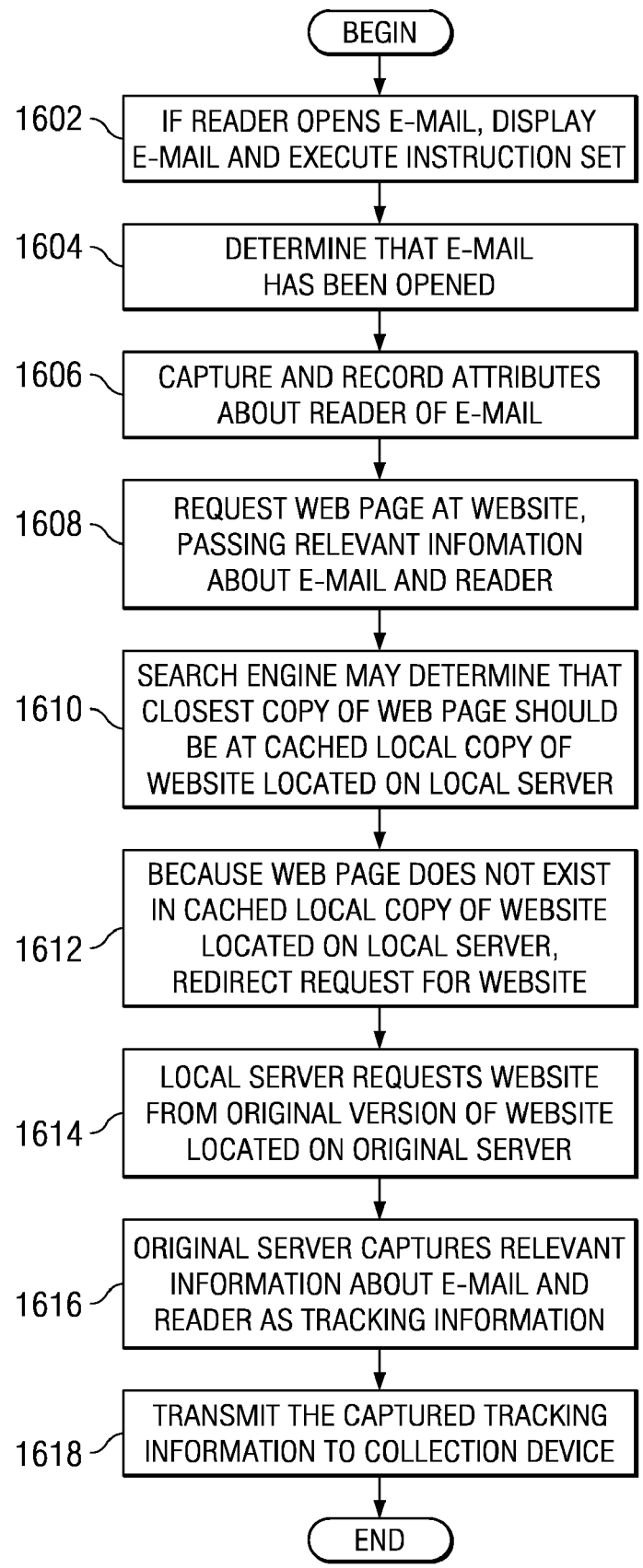
FIG. 16 is an example of a process for placed instructions in an e-mail uniquely identifying the reader of the e-mail, in accordance with an illustrative embodiment of the present invention.

FIG. 16 is an example of a process for placed instructions in an e-mail uniquely identifying the reader of the e-mail, in accordance with an illustrative embodiment of the present invention. In response to a reader opening or pre-viewing an e-mail, an e-mail client displays the e-mail and executes a placed instruction set (step 1602). Based on the execution of the placed instruction set, the placed instruction set determines that the e-mail has been opened or pre-viewed (step 1604). In response to determining the opening or pre-viewing of the e-mail, the placed instruction set executes code that uses graphics interchange format technology to uniquely identify a reader of the e-mail by capturing and recording attributes such as the Internet Protocol (IP) address (step 1606). The placed instruction set requests a web page at a website using an anti-caching graphic interchange format process, passing relevant information about the e-mail and the reader in the form of parameters (step 1608). In response to the placed instruction set requesting the web page, a search engine may determine that the closest copy of the web page should be at a cached local copy of the website located on a local server (step 1610). Because the web page requested by the anti-caching graphics interchange format tracking process does not exist, the request to the cached local copy of the website located on the local server results in a redirected request for the website, instead of a redirected request for the web page (step 1612). To satisfy the resulting request for the website made by the placed instruction set, the local server requests the website from an original version of the website located on an original server (step 1614). This website request to the original server executes graphics interchange format tracking technology to capture the relevant information about the e-mail and the reader in the form of parameters as tracking information (step 1616). The graphics interchange format tracking technology transmits the captured tracking information to a collection device (step 1618). In summary, the anti-caching graphics interchange format tracking process placed as an instruction set in an e-mail that is opened captures and tracks relevant information about the e-mail and the reader through the request made for the website requested and transmits the tracking information to a collection device, regardless of whether the request was made to the original version on a server or a cached local copy on another server.

A similar process occurs for tagged items manipulated in the e-mail. The tagged item may be a tagged attachment, a tagged section, or a tagged link. The manipulation of the tagged item may be the opening of the tagged attachment, the expanding (or collapsing) of a tagged section, or the selecting a tagged link.

Figure 17:
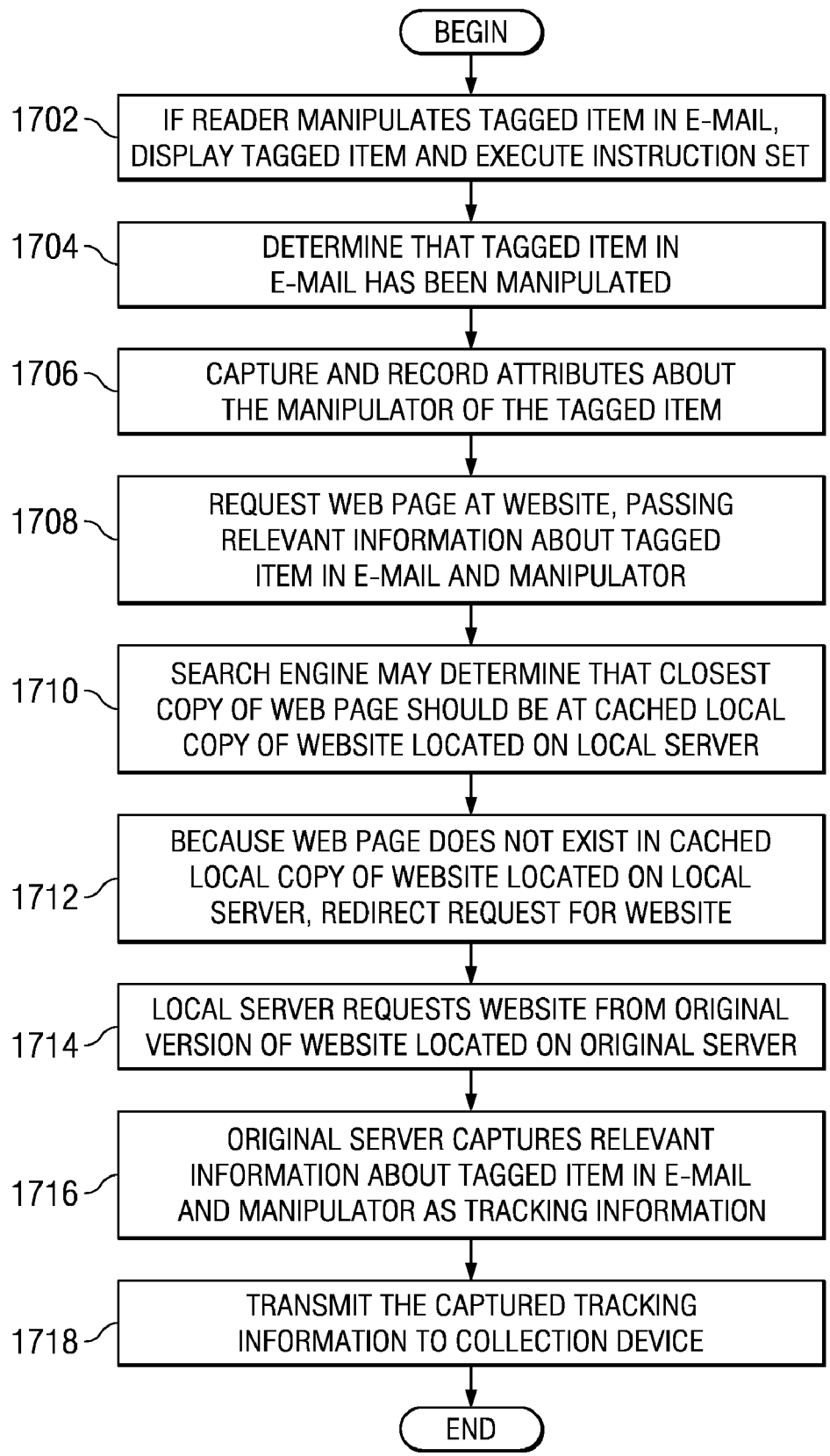
FIG. 17 is an example of a process for instructions appended or pre-pended to a tagged item in an e-mail uniquely identifying the manipulator of the tagged item, in accordance with an illustrative embodiment of the present invention.

FIG. 17 is an example of a process for instructions appended or pre-pended to a tagged item in an e-mail uniquely identifying the manipulator of the tagged item, in accordance with an illustrative embodiment of the present invention. In response to a reader manipulation of a tagged item in an e-mail, an e-mail client displays the tagged item and executes an instruction set (step 1702). Based on the execution of the instruction set, the instruction set determines that the tagged item in the e-mail has been manipulated (step 1704). In response to determining the manipulation of the tagged item in the e-mail, the instruction set executes code that uses graphics interchange format technology to uniquely identify a manipulator of the tagged item in the e-mail by capturing and recording attributes such as the Internet Protocol (IP) address (step 1706). The instruction set requests a web page at a website using an anti-caching graphic interchange format process, passing relevant information about the tagged item in the e-mail and the manipulator in the form of parameters (step 1708). In response to the instruction set requesting the web page, a search engine may determine that the closest copy of the web page should be at a cached local copy of the website located on a local server (step 1710). Because the web page requested by the anti-caching graphics interchange format tracking process does not exist, the request to the cached local copy of the website located on the local server results in a redirected request for the website, instead of a redirected request for the web page (step 1712). To satisfy the resulting request for the website made by the instruction set, the local server requests the website from an original version of the website located on an original server (step 1714). This website request to the original server executes graphics interchange format tracking technology to capture the relevant information about the tagged item in the e-mail and the manipulator in the form of parameters as tracking information (step 1716). The graphics interchange format tracking technology transmits the captured tracking information to a collection device (step 1718). In summary, the anti-caching graphics interchange format tracking process in the instruction set captures and tracks relevant information about the tagged item in the e-mail and the manipulator through the request made for the website requested and transmits the tracking information to a collection device, regardless of whether the request was made to the original version on a server or a cached local copy on another server.

The specific examples of e-mail systems—Lotus Notes®—are for purposes of illustration only and that the different aspects of the present invention may be applied to other e-mail applications, such as CheetahMail®, Silverpop®, and EmailLabs® (CheetahMail is a trademark of David Villeger in the United States, other countries, or both; Silverpop is a trademark of Silverpop Systems Inc. in the United States, other countries, or both; and EmailLabs is a trademark of Uptilt Inc. in the United States, other countries, or both).

Altogether, the flowchart for a process as shown in FIG. 5 and described above provides an improved method for identifying and tracking sections in Lotus Notes® based e-mail campaigns.

The invention can take the form of an entirely hardware embodiment, an entirely software embodiment, or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the embodiments of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for using an anti-caching graphics interchange format process for tracking and reporting non-hypertext markup language e-mail campaigns, the data processing system comprising:
   a bus;
   a storage device connected to the bus, wherein the storage device contains computer usable code;
   a communications unit connected to the bus; and
   a processing unit connected to the bus, wherein the processing unit executes the computer usable code to place an instruction set in a non-hypertext markup language e-mail to form a modified e-mail, wherein a data type of a field for the instruction set is set to hypertext markup language, and send the modified e-mail to a server for a distribution list, wherein the instruction set is executed when the modified e-mail is opened, wherein the instruction set executes computer usable code to capture and record attributes about a reader of the modified e-mail, requesting a web page at a website, pass information about the e-mail and the reader, cause a local server to request the website from an original version of the website located on an original server in response to a non-existence of the web page, cause the original server to capture relevant information about the e-mail and the reader as tracking information, and transmit the captured tracking information to a collection device.

2. The data processing system of claim 1, wherein the processing unit further executes the computer usable code to execute the instruction set in the modified e-mail in response to a selection of an object within the modified e-mail to send information to the collection device about the modified e-mail and the object.

3. The data processing system of claim 2, wherein information about the modified e-mail comprises at least one of a date the object was selected and a time the object was selected.

4. The data processing system of claim 1, wherein the processing unit further executes the computer usable code to execute the instruction set in the modified e-mail when an attachment associated with the modified e-mail is opened, wherein the instruction set sends information to the collection device about the modified e-mail and the attachment.

5. The data processing system of claim 4, wherein information about the modified e-mail comprises at least one of a date the attachment was opened and a time the attachment was opened.

6. The data processing system of claim 1, wherein information about the modified e-mail comprises at least one of a date the modified e-mail was opened, a time the modified e-mail was opened, a date the modified e-mail was pre-viewed, a time the modified e-mail was pre-viewed, a subject of the modified e-mail, a name of an associated campaign, a user name, a browser type, an e-mail client type, a level of the e-mail client, whether a reader used a replica mailbox database, whether the reader used a master mailbox database, an internet sub-domain, and a transmission control protocol over internet protocol address.

7. The data processing system of claim 1, wherein the instruction set comprises at least one of hypertext markup language and extensible markup language.

8. The data processing system of claim 1, wherein the processing unit further executes the computer usable code to execute the instruction set in the modified e-mail when the modified e-mail is pre-viewed, wherein the instruction set sends information to the collection device about the modified e-mail.

9. A computer program product stored on a computer-readable medium for using an anti-caching graphics interchange format process for tracking and reporting non-hypertext markup language e-mail campaigns, the computer program product comprising:
   computer usable program code configured to place an instruction set in a non-hypertext markup language e-mail to form a modified e-mail, wherein a data type of a field for the instruction set is set to hypertext markup language; and
   computer usable program code configured to send the modified e-mail to a server for a distribution list, wherein the instruction set is executed when the modified e-mail is opened, wherein the instruction set executes computer usable program code configured to capture and record attributes about a reader of the modified e-mail, computer usable program code configured to request a web page at a website, computer usable program code configured to pass information about the e-mail and the reader, computer usable program code configured to cause a local server to request the website from an original version of the website located on an original server in response to a non-existence of the web page, computer usable program code configured to cause the original server to capture relevant information about the e-mail and the reader as tracking information, and computer usable program code configured to transmit the captured tracking information to a collection device.

10. The computer program product of claim 9, further comprising computer usable program code configured to execute the instruction set in the modified e-mail in response to the selection of an object within the modified e-mail to send information to the collection device about the modified e-mail and the object.

11. The computer program product of claim 9, further comprising computer usable program code configured to execute the instruction set in the modified e-mail when an attachment associated with the modified e-mail is opened, wherein the instruction set sends information to a collection device about the modified e-mail and the attachment.

12. The computer program product of claim 9, wherein information about the modified e-mail comprises at least one of a date the modified e-mail was opened, a time the modified e-mail was opened, a date the modified e-mail was pre-viewed, a time the modified e-mail was pre-viewed, a subject of the modified e-mail, a name of an associated campaign, a user name, a browser type, an e-mail client type, a level of the e-mail client, whether a reader used a replica mailbox database, whether the reader used a master mailbox database, an internet sub-domain, and a transmission control protocol over internet protocol address.

* * * * *